United States Patent [19]

Ballard et al.

[11] 4,203,109
[45] May 13, 1980

[54] SUBMARINE COMMUNICATION SYSTEM

[75] Inventors: Samuel S. Ballard, Hollis; Ernest E. Vanham, South Lyndeborough, both of N.H.

[73] Assignee: Sanders Associates, Inc., Nashua, N.H.

[21] Appl. No.: 399,640

[22] Filed: Sep. 28, 1964

[51] Int. Cl.² .................................... H04B 3/60
[52] U.S. Cl. ........................... 340/850; 367/4; 455/83; 455/89; 455/96; 455/99; 455/345
[58] Field of Search .......... 340/2, 3 T, 4.5, 5 T, 340/4 A, 4 R; 325/4, 5, 8, 12, 21, 112, 114, 116, 15, 16, 22; 9/8, 9; 114/16.5, 16.7, 235.2; 115/6, 6.1, 7; 343/707, 709

[56] References Cited

U.S. PATENT DOCUMENTS

| | | | |
|---|---|---|---|
| 1,726,607 | 9/1929 | Blanchard | 340/5 UX |
| 2,014,742 | 9/1935 | Mastorakis | 114/16.5 |
| 2,758,203 | 8/1956 | Harris | 325/116 |
| 2,935,606 | 5/1960 | Harrison et al. | 325/21 X |
| 3,093,808 | 6/1963 | Tatnall et al. | 340/2 |
| 3,159,806 | 12/1964 | Piasecki | 340/3 |
| 3,227,954 | 1/1966 | Fichter, Jr. | 325/22 |
| 3,230,500 | 1/1966 | Dunn | 340/5 |
| 3,272,910 | 9/1966 | Flint | 9/8 X |

FOREIGN PATENT DOCUMENTS

| | | | |
|---|---|---|---|
| 411312 | 6/1934 | United Kingdom | 340/4 |
| 947918 | 1/1964 | United Kingdom | 114/235 |

*Primary Examiner*—Richard A. Farley
*Attorney, Agent, or Firm*—Louis Etlinger; Richard I. Seligman

EXEMPLARY CLAIM

1. In a method for communicating information between a submerged vessel and a buoy, the improvement comprising the steps of
   A. allowing said buoy to assume substantially the same horizontal velocity as the water in which it is floating,
   B. feeding out a communication cable interconnecting said buoy with said vessel at substantially the rate at which the distance between said vessel and said buoy increases,
   C. destroying said buoy upon command, and
   D. releasing the fed-out cable from said vessel.

9 Claims, 3 Drawing Figures

SUBMARINE COMMUNICATION SYSTEM

This invention relates to communication with a submerged naval vessel. More specifically, it provides a novel method and apparatus for communicating with a submerged vessel by means of an expendable cable link between the vessel and the surface.

The invention is particularly suited for providing communication between a submerged vessel and aircraft, in which case wireless communication apparatus is connected to the end of the cable at the surface of the water. However, the invention is also useful for communication between a submerged vessel and another water-borne craft without use of the water path between them.

In the past, communication between a submerged vessel and a station above the water has been carried out by sonar communication, and, alternatively through the use of a recoverable communication buoy towed by the vessel with a message-carrying tow cable. The towed buoys are generally very large, cumbersome and costly. Moreover, the hull of the vessel generally requires extensive modification to carry the buoy when it is not in use.

Further, the depth from which the vessel can use the towed buoy is limited and the maneuverability of the vessel is materially restricted during the use of the buoy.

Sonar communication between a buoy and a submerged vessel introduces considerable noise into the signal as it travels through the water. The range of such communication is also limited due to the relatively high attenuation of the water, and motion of the submerged vessel away from the buoy is limited accordingly during use of the system. In addition, other vessels in the vicinity can detect the sonar message.

It is an object of the present invention to provide an improved communication system for a submerged vessel. Particularly, it is an object to provide a system of this type for use between a submerged vessel and a station removed from the water, such as an air-borne station.

It is a further object of the invention to provide communication with a submerged vessel by a method and apparatus compatible with existing vessels and with existing communication equipment.

A further object of the invention is to provide a communication method and apparatus of the above type characterized by high operating efficiency.

Another object of the invention is to provide communication of the above type that is substantially free from detection by other vessels.

It is also an object of the invention to provide a method and apparatus for communicating information between a submerged vessel and the surface wherein the vessel retains relatively high maneuverability during communication.

It is also an object of the invention to provide an improved buoy for communication with a submerged vessel.

Other objects of the invention will in part be obvious and will in part appear hereinafter.

The invention accordingly comprises the features of construction, combinations of elements, and arrangements of parts, and the several steps and relation of one or more of such steps with respect to each of the others, all as exemplified in the following detailed disclosure, and the scope of the invention will be indicated in the claims.

For a fuller understanding of the nature and objects of the invention, reference should be had to the following detailed description taken in connection with the accompanying drawings, in which:

FIG. 1A is a block diagram illustrating a device contained within a buoy for destroying same;

According to the invention, a submarine is equipped with a releasable communication buoy containing a radio transmitter and receiver. The buoy is placed in operation by releasing it from the submarine. A cable interconnecting the vessel and the buoy pays out as the submarine proceeds on its course and the buoy rises to the surface.

After surfacing, the buoy transmits by wireless the messages it receives from the submarine by means of the cable. Incoming messages intercepted by the buoy are sent to the submarine via the cable.

Upon completion of communication, or when the cable is fully paid out, a command can be sent to the buoy to destroy itself and the cable can be severed from the submarine.

Since the cable conducts the messages between the submarine and the buoy, the low signal-to-noise ratios attendant on sonar communication are avoided. Further, the messages are kept from other submerged naval vessels, who can only receive sonar messages. Moreover, as will become more apparent from the ensuing description, a buoy for use in such a communication link can be carried and released by existing equipment in submarines with no hull revision and with only minor changes or additions to the structure of many such vessels.

Figure 1:
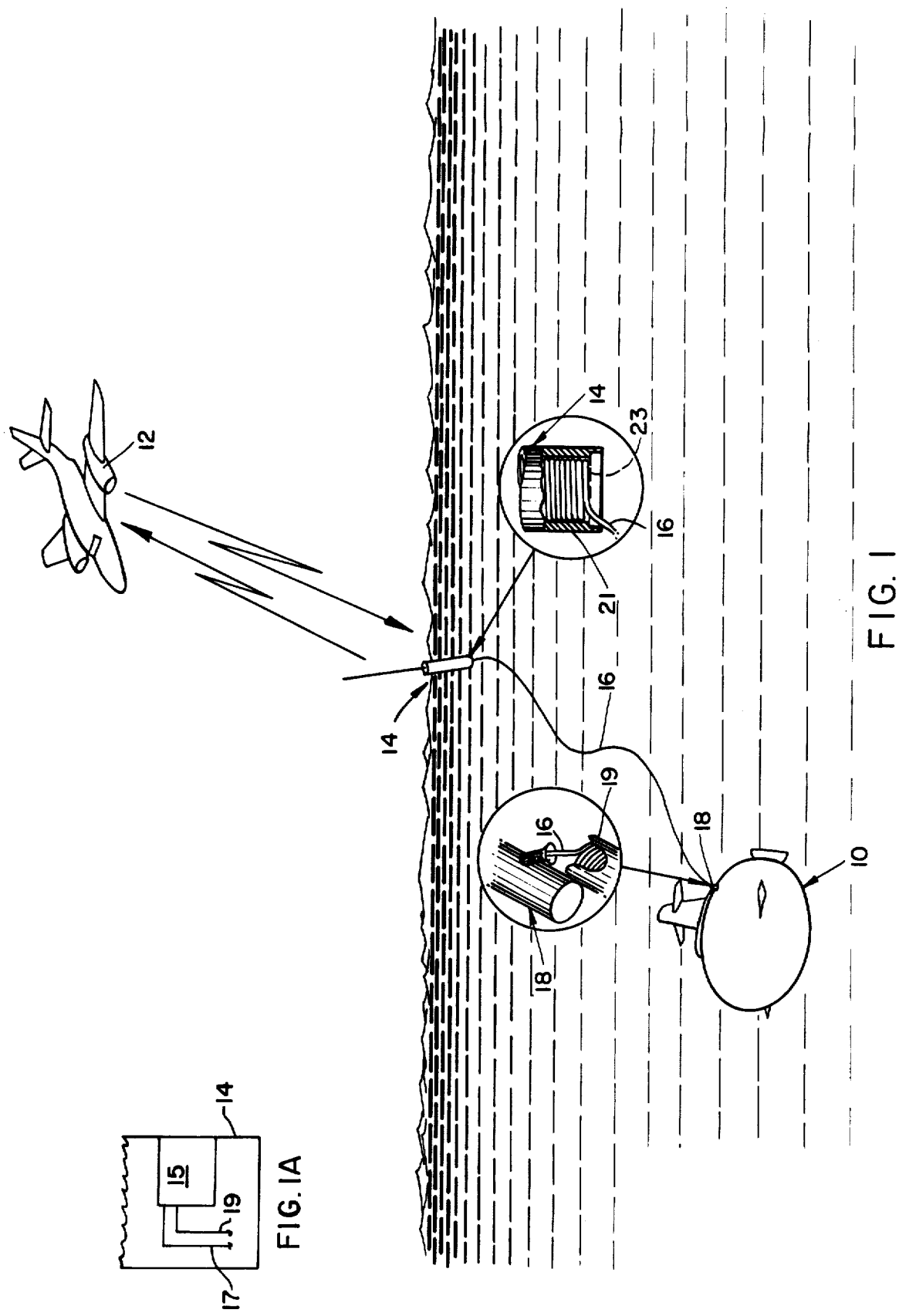
FIG. 1 is a pictorial representation of a submarine-aircraft communication system embodying the invention.

Turning now to FIG. 1, a submarine indicated generally at 10 communicates with an aircraft 12 by means of a buoy indicated generally at 14 connected with the submarine by means of a buoyant cable 16. The buoy and cable are initially carried by the submarine and the buoy is launched when communication is desired. The launching is suitably done through the submarine's signal flare tube 18 or other appropriate launching openings. The initially coiled cable 16 is stored in the submarine in a dispenser 19 that pays out the cable as the buoy rises and as the submarine continues on its course.

In addition to the supply of cable in the dispenser 19 on the submarine, the buoy is preferably also furnished with a cable dispenser 21. This latter dispenser may be filled with a water-soluble cable retainer shown in dotted lines at 23.

The cable 16 is buoyant. Thus rather than hanging from the buoy, it enhances rapid ascent of the buoy as the cable itself has an upward force exerted on it by the water. The cable 16 is only for communication. It is not a tow cable, since the submarine does not tow the buoy but continues to pay out cable throughout use of the buoy. This operation enhances the maneuverability of the submarine during communication and, because of the resulting elimination of drag on the buoy and cable, it markedly reduces the mechanical design requirements imposed on the buoy construction as well as on the cable tensile strength. These factors simplify and lighten the apparatus.

Also the elimination of drag avoids the downward pull on the buoy resulting from submarine motion. Therefore, use of the system makes possible relatively high-speed submarine movement during communication.

Another alternative embodiment is to utilize the cable dispenser 21 to carry the total supply of cable. In this embodiment, the cable dispenser 21 would be an integral part of the buoy when launched and separate after the ejection of the unit. The cable dispenser and the buoy can be designed to be latched together to form a common housing which would separate after launch. Or on the other hand, the buoy and cable dispenser could be launched as two separate units. In this case, the cable dispenser 21 designed to have a positive buoyancy could be attached to the submarine through a communication line which would maintain it some distance behind the submarine propellers. This could be controlled by letting out just enough line for the submarine at launch or providing a separate reel for a short cable in the top cable dispenser 21 for this purpose in addition to the regular long line for the buoy.

When the buoy reaches the surface of the water, it may develop a signal so informing the submarine personnel. Alternatively, this feature can be eliminated to simplify the buoy apparatus, and the time of surfacing calculated with considerable accuracy from a knowledge of the submarine depth and the rate at which the buoy rises.

As discussed below in greater detail, communication between the submarine and the buoy is suitably at audio frequencies and the wireless communication between the buoy and the aircraft is carried out at radio frequencies. When communication is completed, or when the cable 16 is fully paid out, the submarine personnel send a signal to the buoy that causes the buoy to destroy itself, as by scuttling so that it sinks to the bottom of the ocean. The paid-out cable is then severed or otherwise released from the submarine. FIG. 1A illustrates one method of destroying buoy 14. A device 15 such as an explosive or squib arrangement is actuated by a signal received along a pair of wires 17, 19 connected between the submerged vessel and the buoy, the wires being contained within buoyant cable 16. The cable is severed after the buoy is destroyed by, for example, simply cutting same.

Figure 2:
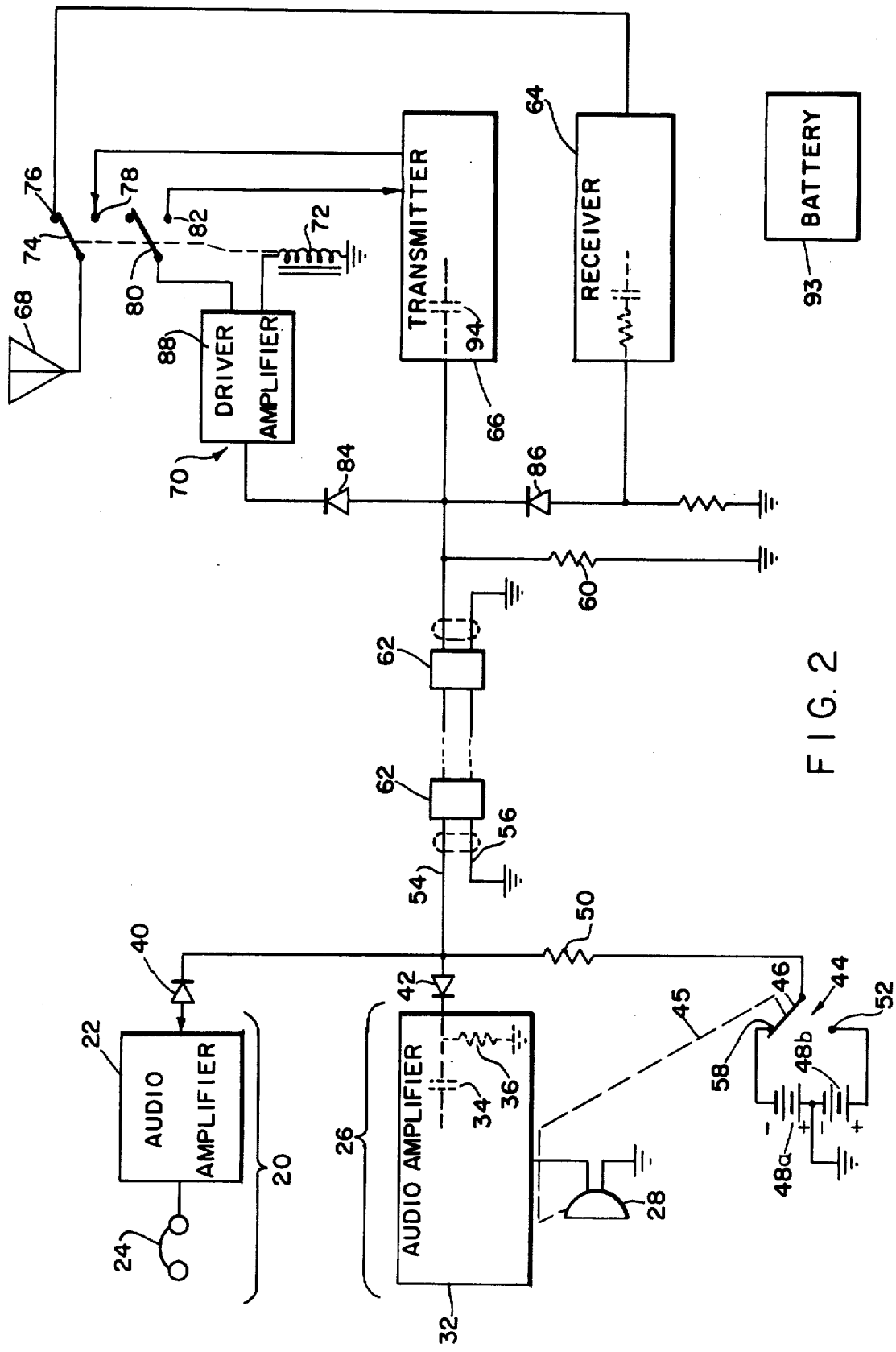
FIG. 2 is a block diagram of submarine and buoy communication equipment for the system of FIG. 1.

Turning now to FIG. 2, the submarine is equipped with audio receiving equipment indicated generally at 20, including an audio amplifier 22 whose output signal is fed illustratively to a pair of head phones 24. Also in the submarine is audio send equipment indicated generally at 26 comprising a microphone 28. The signal developed in the microphone is amplified by an amplifier 32 prior to delivery to the cable 16. The output circuit of the amplifier 32 may include a d.c. blocking capacitor 34 and a load resistor 36.

Send/receive control apparatus is connected with the receiving equipment 20 and the sending equipment 26 to place one of these units in circuit with the cable 16 while isolating the other unit from the cable. The illustrated control apparatus comprises a gating diode 40 in series between the amplifier 22 and the cable 16 and a diode 42 between the cable and the amplifier 26. In addition, a single-pole, double-throw push-to-talk switch indicated generally at 44 has a switch arm 46 connected to the cable 16. Two oppositely poled batteries 48a and 48b are connected between the two switch contacts 58 and 52 and a common conductor indicated as ground.

As also shown in FIG. 2, the cable 16 has a message conductor 54 shielded by a grounded conductor 56. A terminating resistor 50 is connected at the submarine end of the cable 16, in series with the switch arm 46. At the buoy end of the cable, a terminating resistor 60 is connected from the message conductor 54 to ground.

Where the cable 16 has substantial length and hence significant signal attenuation, one or more line amplifiers 62 may be connected at spaced intervals along the cable. The details of a preferred line amplifier are described below with reference to FIG. 3. It should be noted that the line amplifiers deliver to the buoy equipment the control voltage received via the cable 16 from the submarine batteries 48a and 48b.

With further reference to FIG. 2, the buoy 14 of FIG. 1 houses a radio receiver indicated generally at 64 and a transmitter indicated generally at 66. In addition, the buoy is equipped with an antenna 68 and also with transmit/receive control apparatus which connects either the receiver or the transmitter between the antenna 68 and the cable 16.

The illustrated control apparatus comprises a double-pole, double-throw relay having a coil 72. A transfer contact 74, connected to the antenna 68, alternately engages relay contacts 76 and 78 connected, respectively, to the input of the receiver 64 and the output of the transmitter 66. A second transfer contact 80 engages a fixed relay contact 82 when the relay coil 72 is energized. The contact 74 normally, i.e. when the coil 72 is not energized, engages the contact 76 to connect the antenna 68 with the radio receiver 64.

The transmit/receive control apparatus also includes two gating diodes 84 and 86. The diode 84 is connected between the cable 16 and the relay coil 72; a driver amplifier 88 may be inserted in this signal path as indicated. The diode 86 is in series between the output of the receiver 64 and the message conductor 54 of the cable 16.

The overall operation of the submarine-buoy communication link will now be described. Assume that the communication link is in the receive condition with the push-to-talk switch 44 in the submarine in the condition shown. The switch arm 46 thus engages the contact 58 to place the battery 48a in circuit with the cable 16 and apply a negative d.c. control voltage to the message conductor 54. This negative control voltage reverse biases the diode 42 connected with the submarine sending equipment 26 and, in the buoy, reverse biases the diode 84. The diode 40 in the submarine and the diode 86 in the buoy, however, are forward biased to conduct with negligible resistance. With the buoy diode 84 biased for non-conduction, the relay coil 72 is not energized and the antenna 68 is connected by means of the relay contact 74 to the buoy receiver 64.

Accordingly, radio signals intercepted by the antenna 68 are applied to the radio frequency receiver 64. The audio frequency output signal from the receiver 64 is applied to the message conductor 54 of the cable 16 through the forward-biased diode 86.

At the submarine end of the cable 16, the incoming audio frequency signal is applied through the forward-biased diode 40 to the amplifier 22 and thence to phones 24.

Still considering the receiving operation, the reverse-biased diode 84 in the buoy blocks the incoming audio frequency signal from the relay coil 72. Also, the transmitter 66 has a high input impedance relative to the impedance of the cable 16. Thus, substantially all of the output from the buoy receiver 64 is applied to the cable 16. Similarly, in the submarine, the reverse-biased diode 42 blocks the incoming signal from the amplifier 32.

To transmit information from the submarine, the push-to-talk switch 44 of FIG. 2 is pressed to connect the battery 48b with the switch arm 46. This applies the positive control voltage from the battery 48b to the cable message conductor 54 and thereby forward biases the diodes 42 and 84 for conduction and reverse biases the diodes 40 and 86.

The control signal therefore reaches the relay coil 72 by way of the diode 84, after amplification by the amplifier 88 if the latter is used. The signal operates the relay to connect the antenna 68 to the output terminals of the transmitter 66. Also, the relay transfer contact 80 engages the contact 82 to apply operating power from the driver amplifier 88 to the transmitter, which is normally off to conserve the battery 93 in the buoy.

After amplification in the submarine amplifier 32, the signals developed by the microphone 28 pass to the cable 16 and then to the buoy transmitter 66. In the submarine, the diode 40 blocks the outgoing signal from the receiving equipment 40. The transmitter 66 develops a modulated radio frequency signal corresponding to the outgoing audio signal and delivers it to the antenna 68.

With further reference to FIG. 2, the amplifier 22 in the submarine and an amplifier (not shown) in the transmitter 66 may be arranged to introduce sufficient equalization to the audio signals to compensate for the phase-attenuation characteristics of cable 16. Also, the line amplifiers 62 connected in the cable 16 may provide equalization.

It will also be understood that the submarine input and output devices, i.e. the microphone 28 and the head phones 24, are merely illustrative of communications input devices and output devices in general.

Figure 3:
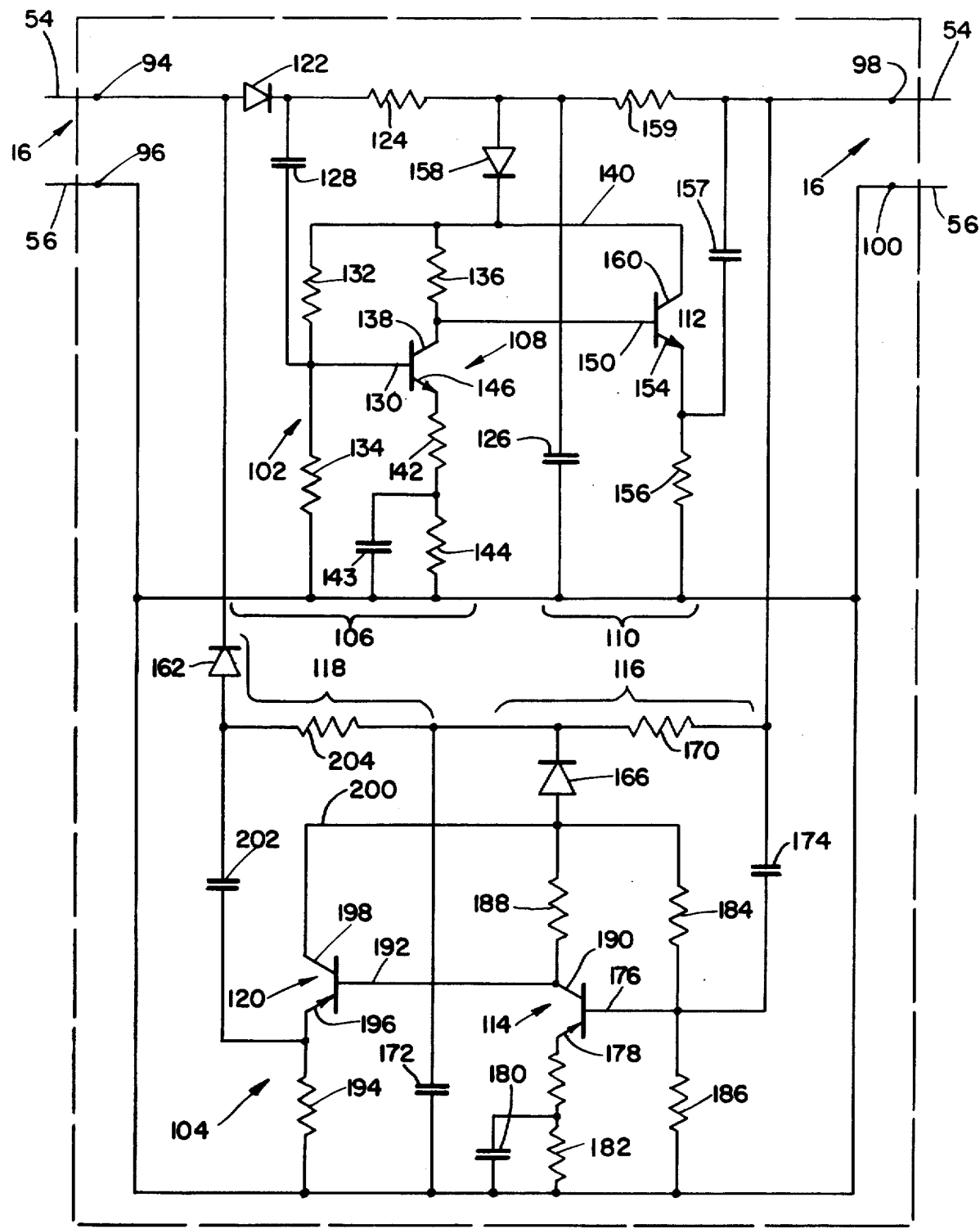
FIG. 3 is a schematic representation of a two-way amplifier suitable for use with the invention.

FIG. 3 shows a preferred line amplifier 62 for connection at intervals in the cable 16. As will now be discussed in detail, the amplifier amplifies audio signals alternately in both directions according to the control voltage it receives. Moreover, the control signals, message signals and power for the amplifier are all applied thereto over two audio-signal conductors 54 and 56. This provides a substantial economy in the cable 16 by eliminating additional conductors therefrom. Elimination of additional conductors also makes it easier to provide buoyancy for the cable 16 and it results in a smaller cable storage space in the submarine.

At its left end in FIG. 3, the amplifier 62 has terminals 94 and 96 connected respectively to the cable conductors 54 and 56. Similarly, at its right end, amplifier terminals 98 and 100 are connected to these conductors.

In general, the amplifier 62 comprises two subsidiary amplifiers, indicated generally at 102 and 104, connected in parallel between the terminal pair 94–96 and the terminal pair 98–100. The amplifier 102 is arranged to amplify signals arriving at the terminal pair 94–96 and to apply them to the terminal pair 98–100, whereas the amplifier 104 is arranged to amplify signals travelling on the cable 16 in the opposite direction, i.e., arriving at the terminal pair 98–100.

The amplifier 102 has an amplifier stage 106 employing a transistor 108 in a common-emitter configuration. A low impedance output stage 110, employing a transistor 112 connected as an emitter-follower, couples the output from the amplifier stage 106 to the cable 16. Similarly, the amplifier 104 has a common-emitter transistor 114 operating in an amplifier stage 116 followed by a low impedance stage 118 employing an emitter-follower transistor 120.

Only one of the amplifiers 102–104 operates at a time, the other being isolated from the cable according to the control voltage between the cable conductors 54 and 56.

More specifically, assume that a signal is to be transmitted from the submarine to the buoy so that the conductor 54 is at a positive control potential with respect to the conductor 56. The audio signal developed in the submarine sending equipment 26 (FIG. 2) arrives at the amplifier terminals 94–96. In the amplifier 102, the control voltage between the cable conductors 54 and 56 forward biases a diode 122 to apply the audio signal to the base 130 of transistor 108 by way of a coupling capacitor 128. The transistor amplifies this signal by a factor approximately equal to the ratio of the resistance of load resistor 136 to the resistance of the emitter resistor 142.

The supply voltage for the amplifier 102 appears between the terminal 96 and a common connection 140. It is derived from the control voltage between the terminals 94 and 96, and differs from the control voltage by the drop across a resistor 124 and a diode 158. The diode is forward biased when the cable conductor 54 is at a positive control voltage with respect to the cable conductor 56.

The resistor 124 and a bypass capacitor 126 form a filter that isolates the audio signal from the supply for the control voltage. The load resistor 136 is connected between the collector 138 and the connection 140. Base-emitter bias is provided in part by a voltage divider comprising resistors 132 and 134 connected between the connection 140 and terminal 96. Also, resistors 142 and 144 are connected in series between the transistor emitter 146 and the cable conductor 56, with an audio bypass capacitor 148 shunting the resistor 144.

The amplified signal output from the amplifier stage 106, developed between the collector 138 and the conductor 56, is direct coupled between the base 150 and the emitter 154 of the transistor 112. A resistor 156 connects the emitter 154 to the conductor 56 and the collector 160 of the transistor 112 is connected directly to the common connection 140.

A capacitor 157 couples the output signal from the amplifier 102, developed across the resistor 156, to the amplifier terminals 98 and 100.

As also shown in FIG. 3, a resistor 159 is connected between the terminal 98 and the connection of resistor 124 and capacitor 126 to form, with the resistor 124 and the diode 122, a unidirectional direct current path between the terminal 94 and the terminal 98. This path transfers the control signal from the terminal pair 94–96 to the terminals 98 and 100 for operating succeeding line amplifiers connected in the cable 16 and also for operating the transmit/receive control apparatus in the buoy. The resistors 124 and 159 are selected to present to the audio signal an impedance that is markedly larger than the audio frequency impedance presented to the terminals 94–96 by the signal path through the transistors 108 and 112.

With the positive d.c. control voltage between the cable conductors 54 and 56, providing the above operation of the amplifier 102, diodes 162 and 166 in the amplifier 104 are reverse biased and the transistors 114 and 120 draw essentially no current. Thus, essentially all of the audio signal input at the terminals 94–96 is applied to the amplifier 102. Also, in the amplifier 104, the resistances of the resistors 170 and 186, both capacitively coupled between the terminals 98–100, are much larger than the output impedance of the amplifier 102. Accordingly, the amplifier 104 absorbs a relatively negligible portion of the audio output signal developed by the amplifier 102 across the terminal pair 98–100.

During reception of signals at the submarine's receiving equipment 20 (FIG. 2) the push-to-talk switch 44 is in the position shown in FIG. 2 and the battery 48a is connected in the communication circuit. As a result, the message conductor 54 of the cable 16 is at a negative control voltage with respect to the cable conductor 56. This control signal forward biases the diodes 162 and 166 in the amplifier 104 to conduct with relatively little resistance.

In the amplifier 104, the audio signal from the buoy arrives at the terminals 98–100 and is applied through capacitor 174 to the base 176 of the transistor 114. Again, the amplifier supply voltage is derived from the control signal at the terminals 94 and 96. It appears between a common connection 200 and the cable conductor 56. The junction 200 is isolated from the audio signals at the input and output of the amplifier 104 by a filter comprising series resistors 170 and 204 and a bypass capacitor 172.

An audio bypass capacitor 180 in parallel with an emitter bias resistor 182 connects the transistor emitter 178 to the terminal 100. The other bias resistors for the transistor 114 are the resistors 184 and 186 connected as a voltage divider for the transistor base 176. A load resistor 188 is between the transistor collector 190 and the junction 200.

The amplified output signal from the transistor 114 is direct coupled from the collector 190 to the base 192 of the emitter-follower transistor 120. The transistor 120 has an output resistor 194 connected between its emitter 196 and the amplifier terminal 96. A capacitor 202 couples the audio signal output from the emitter-follower stage 118 to the forward-biased diode 162 connected to the terminal 94.

The resistors 170 and 204 provide a direct current path to transfer the control signal for the receiving operation from the terminal pair 94–96 to the terminal pair 98–100.

During operation of the amplifier 104, the negative control voltage on the message conductor 54 reverse biases the diodes 122 and 158 in the amplifier 102 and thereby maintains the transistors 108 and 112 therein nonconducting. Thus, due to the relatively high resistance of the resistors 159 and 156, the amplifier circuit 102 is effectively isolated from the cable 16 and absorbs effectively none of the audio input and output signals at the terminal pairs 98–100 and 94–96, respectively.

It will be seen that the amplifiers 102 and 104 are essentially identical. The amplifier 102 employs npn transistors, whereas the amplifier 104, operating with a supply voltage of the opposite polarity, employs pnp transistors.

It will, however, be noted that the amplifier 102 has an isolating diode, the diode 122, in its input circuit whereas the amplifier 104 does not have a corresponding diode. On the other hand, the amplifier 104 has a diode 162 connected between terminal 94 and its output, and there is no corresponding diode in the amplifier 102.

These differences stem from the fact that the amplitudes of the operating and bias voltages, provided by the control voltages, are somewhat smaller at the terminals 98–100 than at the terminals 94–96.

The line amplifier 62 has essentially identical operating characteristics for audio signals travelling in either direction on the cable 16. The d.c. control signals applied to the cable conductors determine the direction in which the amplifier provides amplification and they also power the transistors. Transmission of the control signals by the amplifier permits cascading of similar amplifiers at intervals along the cable 16, as shown in FIG. 2, with all the amplifiers being powered and controlled from the submarine. It also permits transmission of the control signals to the buoy for operation thereof as described above. All of this is accomplished with only two cable conductors, with the amplifiers inserted in series in one of the conductors.

In summary, the invention provides a novel communication link in which a buoyant cable connects a submerged vessel with a stationary, i.e. non-towed, expendable buoy for communication between the vessel and other vessels as well as with stations removed from the water. The invention can be practiced with existing submarines with only a minimal amount of fitting. Moreover, the maneuverability of the submerged vessel is relatively unrestricted while the buoy is in use.

The buoys and the cable are compact and of relatively low cost, thereby facilitating widespread usage and on-board storage.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. In a method for communicating information between a submerged vessel and a buoy, the improvement comprising the steps of
   A. allowing said buoy to assume substantially the same horizontal velocity as the water in which it is floating,
   B. feeding out a communication cable interconnecting said buoy with said vessel at substantially the rate at which the distance between said vessel and said buoy increases,
   C. destroying said buoy upon command, and
   D. releasing the fed-out cable from said vessel.

2. A method for communicating with a submerged vessel, said method comprising the steps of
   A. interconnecting a supply of buoyant communication cable between the vessel and an expendable buoy carried therewith,
   B. releasing said buoy from said submerged vessel,
   C. allowing said buoy to assume substantially the same horizontal velocity as the water in which it is carried, D. increasing the length of said cable between said buoy and said vessel at substantially the rate at which the distance between said vessel and said buoy increases,
E. communicating information between said vessel and said buoy by means of said cable,
F. destroying said buoy, and
G. removing the cable extending from said vessel.

3. The method defined in claim 2
A. in which said communicating step is carried out by sending information signals between said vessel and said buoy on said cable exclusive of a carrier frequency signal, and
B. further comprising the steps of
1. transmitting from said buoy to the air a radio frequency signal corresponding to the signal received at said buoy on said cable, and
2. intercepting at said buoy a modulated radio frequency signal and sending to said vessel via said cable a signal corresponding to the modulation of said intercepted signal.

4. Apparatus for communicating information between a submerged vessel and a station removed from the water in which said vessel is submerged, said apparatus comprising
A. a communication buoy having
1. information sending equipment and
2. information receiving equipment,
B. a buoyant cable as the only link between the submerged vessel and said buoy,
C. means interconnecting one end of said cable with both said sending equipment and said receiving equipment,
1. said interconnecting means selectively placing said cable in circuit with one of said equipments and electrically isolating it from the other, and
D. dispenser means containing a supply of said cable forming a common housing with said buoy, said dispenser means arranged to separate from said buoy and feed-out cable as the distance between said vessel and said buoy tends to increase.

5. The apparatus defined in claim 4 wherein said dispenser means contains means to feed out said dispenser to a distance beyond the vessel's propeller wash.

6. Apparatus for communicating information with a submerged vessel, said apparatus comprising in combination
A. a buoy,
B. an antenna mounted on said buoy,
C. at least a pair of conductors supported at said buoy for connection to a cable connected to the submerged vessel,
D. electrical signal receiving equipment carried by said buoy and having an input port and an output port,
E. electrical signal transmitting equipment carried by said buoy and having an input port and an output port, and
F. transmit/receive control means
1. carried by said buoy,
2. connected to said conductor,
3. responsive to a control signal received from said conductor to place one of said equipments operatively in circuit between said antenna and said conductors and simultaneously electrically isolate the other equipment from at least one of the terminal devices formed by said antenna and said conductors,
4. said control means comprising
a. switch means
1. connected with said antenna and with said input port of said receiving equipment and with said output port of said transmitting equipment,
2. forming a signal path between said antenna and said output of said transmitting equipment only in response to a first control signal
b. a first electrical gating device
1. connected between said conductor and said output port of said receiving equipment,
2. said first gating device forming a signal path between said conductor and said output port of said receiving equipment only in response to a second control signal.

7. The apparatus defined in claim 6 in which said control means further comprises a second electrical gating device connected between said conductors and said switch means and forming a signal path between said conductor and said switch means only in response to said second control signal.

8. Apparatus for communicating with a submerged vessel, said apparatus comprising in combination
A. a buoy having
1. information sending equipment and
2. information receiving equipment,
B. a cable having first and second extreme ends and comprising two electrical conductors,
C. switching means in said buoy connected with said cable at said first end thereof and connected to both said sending equipment and said receiving equipment,
1. said switching means responding to equipment-identifying control signals received from said cable to place the equipment identified by said control signals in circuit with said cable and electrically isolate the other equipment from said cable, and
D. at least one line amplifier
1. having first and second pairs of terminals,
2. connected in series in said cable intermediate said extreme ends with said first pair of terminals connected to said conductors and with said second pair of terminals connected to said conductors,
3. applying to said second pair of terminals an amplified signal corresponding to an information signal input thereto at said first pair of terminals in response to a first control signal applied to said first pair of terminals,
4. applying to said first pair of terminals an amplified signal corresponding to an information signal input at said second pair of terminals in response to a second control signal applied to said first pair of terminals, and
5. transferring said first and second control signals from said first pair of terminals to said second pair of terminals.

9. The apparatus defined in claim 8 in which said control signals are direct current signals.

* * * * *